(12) United States Patent
Weitgasser et al.

(10) Patent No.: US 12,304,840 B2
(45) Date of Patent: May 20, 2025

(54) CARTRIDGE, IN PARTICULAR SANITIZING CARTRIDGE, AND SYSTEM FOR SANITIZING A DRINKING-WATER DEVICE, AND METHOD FOR SANITIZING SAID DEVICE

(71) Applicant: BWT Holding GmbH, Mondsee (AT)

(72) Inventors: Katharina Weitgasser, Wals (AT); Reinhard Mair-Zeininger, St.Georgen im Attergau (AT); Markus Enzinger, Thalgau (AT)

(73) Assignee: BWT Holding GmbH, Mondsee (AT)

( * ) Notice: Subject to any disclaimer, the term of this patent is extended or adjusted under 35 U.S.C. 154(b) by 432 days.

(21) Appl. No.: 17/792,159

(22) PCT Filed: Oct. 7, 2020

(86) PCT No.: PCT/EP2020/078120
§ 371 (c)(1),
(2) Date: Jul. 12, 2022

(87) PCT Pub. No.: WO2021/144045
PCT Pub. Date: Jul. 22, 2021

(65) Prior Publication Data
US 2023/0099462 A1    Mar. 30, 2023

(30) Foreign Application Priority Data

Jan. 13, 2020 (DE) .................... 10 2020 100 554.7

(51) Int. Cl.
*C02F 1/00* (2023.01)
*B01D 29/11* (2006.01)
(Continued)

(52) U.S. Cl.
CPC .............. *C02F 1/688* (2013.01); *B01D 29/11* (2013.01); *B01D 29/88* (2013.01); *B01D 29/96* (2013.01);
(Continued)

(58) Field of Classification Search
CPC .......... C02F 1/688; C02F 1/003; C02F 1/283; C02F 1/42; C02F 2201/006;
(Continued)

(56) References Cited

U.S. PATENT DOCUMENTS 6,004,458 A    12/1999   Davidson
6,245,228 B1 *  6/2001   Kelada .................... C02F 1/002
                                                    210/473
(Continued)

FOREIGN PATENT DOCUMENTS

DE          19806651 A1 *  9/1999 ............ B01D 29/68
DE       102010005893 A1     7/2011
(Continued)

OTHER PUBLICATIONS

English translation of Patent Publication IT 1044383B, published Mar. 20, 1980. (Year: 1980).*

(Continued)

*Primary Examiner* — Joseph W Drodge
(74) *Attorney, Agent, or Firm* — Smartpat PLC (57) ABSTRACT

A system for sanitizing a drinking water-carrying device includes a filter candle that can be installed in a filter head. The filter head has one inlet and one outlet, and the system includes a sanitizing cartridge which can replace the filter candle. The sanitizing cartridge includes a sanitizing agent that can be flushed into the drinking water-carrying device via the filter head.

10 Claims, 8 Drawing Sheets

(51) Int. Cl.
*B01D 29/88* (2006.01)
*B01D 29/96* (2006.01)
*B01D 35/30* (2006.01)
*C02F 1/28* (2023.01)
*C02F 1/42* (2023.01)
*C02F 1/68* (2023.01)

(52) U.S. Cl.
CPC ............ *B01D 35/306* (2013.01); *C02F 1/003* (2013.01); *C02F 1/283* (2013.01); *C02F 1/42* (2013.01); *C02F 2201/006* (2013.01); *C02F 2303/04* (2013.01); *C02F 2307/10* (2013.01)

(58) Field of Classification Search
CPC .............. C02F 2303/04; C02F 2307/10; C02F 2201/003; C02F 2303/14; C02F 1/68; C02F 1/685; C02F 1/686; C02F 1/687; B01D 24/12; B01D 24/14; B01D 24/167; B01D 24/186; B01D 29/11; B01D 29/88; B01D 29/90; B01D 29/96; B01D 2201/24; B01D 2201/307; B01D 2201/40; B01D 35/30; B01D 35/306
See application file for complete search history.

(56) References Cited

U.S. PATENT DOCUMENTS

| | | |
|---|---|---|
| 8,888,996 B2 | 11/2014 | Grottini |
| 2008/0202992 A1* | 8/2008 | Bridges .................. C02F 1/688 210/85 |
| 2011/0121036 A1 | 5/2011 | Bassett |
| 2011/0192429 A1 | 8/2011 | Underwood et al. |
| 2011/0284479 A1* | 11/2011 | O'Brien .................. C02F 1/002 210/764 |
| 2014/0202940 A1* | 7/2014 | Shaffer ................ B01D 35/153 137/511 |
| 2017/0276275 A1* | 9/2017 | Beemer .................. G01N 30/60 |
| 2018/0147506 A1 | 5/2018 | Hazine et al. |

FOREIGN PATENT DOCUMENTS

| | | | | |
|---|---|---|---|---|
| IT | 1044383 B | * | 2/1980 | ............ B01D 24/12 |
| RU | 2233798 C2 | * | 8/2004 | ................ C02F 1/32 |

OTHER PUBLICATIONS

English translation of Patent Publication RU 2233798C2, published Aug. 10, 2004. (Year: 2004).*

English translation of Patent Publication: DE 19806651A1, published Sep. 2, 1999. (Year: 1999).*

Bevi Tab aqua. Webshop. URL: http://www.beviclean.com/produkte/reinigungsmittel/bevi-tab.html, archived at http://www.archive.org on Sep. 12, 2017: https://web.archive.org/web/20170912143855/http://www.beviclean.com/produkte/reinigungsmittel/bevi-tab.html [retrieved on Jun. 3, 2022].

Grohe Blue Adapter für Reinigungskartusche. Product Description. Grohe.URL: https://www.grohe.de/notepad/v1/exports/product/40694000?locale=de_de&fallback_image=//cdn.cloud.grohe.com/Web/4_3/ZZH_IKONEC011_001_01_4_3/4_3/1280/ZZH_IKONEC011_001_01_4_3_4_3.jpg [abgerufen am Jun. 3, 2022].

Grohe Blue bio-Clean. Sicherheitsdatenblatt. Grohe. 2014. URL: https://web.archive.org/web/20170426155726if_/https://cdn.cloud.grohe.com/tpi/2000/2000/2040/2045/2045704/original/2045704.pdf#_ga=2.194112749.1125437317.1493222247-83171447.1493222247 [retrieved am Jun. 3, 2022].

* cited by examiner

CARTRIDGE, IN PARTICULAR SANITIZING CARTRIDGE, AND SYSTEM FOR SANITIZING A DRINKING-WATER DEVICE, AND METHOD FOR SANITIZING SAID DEVICE

TECHNICAL FIELD

The disclosure relates to a system for releasing an agent into water, in particular for sanitizing a drinking water-carrying device such as a water dispenser. The drinking water-carrying device can in particular comprise a tank and/or conduits in which the water stands when the device is not in use. The disclosure also relates to a cartridge for such a system. Furthermore, the disclosure relates to a method for sanitizing a drinking water-carrying device.

BACKGROUND

There are various drinking water-carrying devices known which are connected to an existing drinking water pipe on site. More particularly, water dispensers are known which can dispense chilled carbonated water, allowing to dispense with the provision of carbonated water in bottles. Such water dispensers often also offer the option of dispensing only chilled water or even non-chilled water.

For subjecting the tap water to a treatment, filter candles are known and are connected upstream of such a drinking water-carrying device. For such a filter candle, a filter head is provided on site, which is connected inline in the on-site water pipe that leads to the drinking water-carrying device.

A replaceable filter candle used for this purpose may, for example, comprise an ion exchange material for softening the water and activated carbon for removing contaminants and bacteria.

Such a system is marketed under the trade name BWT Bestmax®, for example.

The water flows through the filter candle and is treated thereby, so that it can be used as an even better drinking water, e.g. for a water dispenser or for a machine for preparing hot beverages.

What is currently not optimally solved is the sanitizing of such drinking water-carrying devices. Often, they include a tank which holds carbonated water, for example, as well as various conduits for feeding and dispensing the water.

In some devices, a tank can be cleaned by the consumer, for example by filling the container with a sanitizing liquid.

However, this is inconvenient and requires handling of the sanitizing agent, which might even be dangerous, in particular in the case of strongly acidic or strongly basic sanitizing agents.

Moreover, it is usually hardly possible to also clean all the conduits of the drinking water-carrying device.

SUMMARY

The disclosure is based on the object of at least mitigating the stated drawbacks of the prior art.

More particularly it is an object of the disclosure to provide a system and a sanitizing cartridge as well as a method for sanitizing a drinking water-carrying device, which ensure convenient and simple handling and at the same time an optimized sanitizing effect of the device.

The object is achieved by a system for sanitizing a drinking water-carrying device, by a cartridge and by a method for sanitizing a drinking water-carrying device as described herein.

The cartridge is preferably provided in the form of a sanitizing cartridge.

However, according to other embodiments the cartridge may also be used for releasing a different agent into the water, e.g. a substance for the restoration of an installation system, a dye, e.g. for leak detection, a sealant, a coating material, an additive for drinking water such as a trace element, a minerals or a flavoring substance.

As far as reference will be made to a sanitizing cartridge or a sanitizing agent below, this shall more generally encompass a cartridge in general, in particular for releasing an agent into the water.

The disclosure moreover relates to a method for sanitizing a drinking water-carrying device. The drinking water-carrying device may in particular be a water dispenser or a machine for preparing beverages such as a vending machine for preparing hot beverages, e.g. coffee.

The drinking water-carrying device is connected to an on-site water pipe. It will be appreciated that this water pipe is pressurized, for example at between 1 and 10 bar.

In order to supply the drinking water-carrying device with water, a filter candle containing a water treatment medium is connected into the feed pipe.

For this purpose, a filter head is provided, which is connected into a feed pipe and in which the filter candle is installed. The filter head therefore has an inlet and an outlet through which the filter head is connected into the pipe by having its inlet and outlet connected to the pipe.

It will be appreciated that the filter head can also be arranged in or on the drinking water-carrying device, or that it is located in a feed pipe at a distance from the drinking water-carrying device.

The filter candle can in particular include an ion exchange material for softening the water and/or activated carbon for removing contaminants or bacteria.

For being connected into the feed pipe, the filter head has an inlet and an outlet.

Thus, the disclosure provides a system in which the filter candle is integrated inline in a pressurized water conduit, so that the inlet is already pressurized.

The system comprises a cartridge that can replace the filter candle, in particular a sanitizing cartridge comprising an agent, in particular a sanitizing agent which can be flushed into the drinking water-carrying device by way of the filter head.

Hence, the connection or port of the filter candle, through which the water flows into the filter candle and from the filter candle back to the filter head is used to flush the agent into the downstream water-carrying conduits and/or tank.

This has the advantage that not only a single tank can be flushed with a liquid, in particular a sanitizing liquid, but all conduits and/or tanks located downstream of the filter candle.

Furthermore, the application is simple and convenient, in particular there is no need for the user to handle a sanitizing agent manually.

For example, the sanitizing process may be executed when the filter candle has to be replaced anyway. In this case, only one intermediate step is required, namely the installing of the sanitizing cartridge and flushing-in of the sanitizing agent.

It goes without saying that the cartridge has a connection, i.e. a port, corresponding to that of the filter head.

Thus, the cartridge also has an inlet and an outlet.

For example, the inlet and the outlet may be provided in the form of a passage extending coaxially to a central axis and an annular passage extending therearound.

Both the filter candle and the cartridge are preferably screwed into the filter head, and in the connected state the passages for introducing and discharging water are sealed by seals which may be arranged on the filter head and/or on the filter candle or cartridge, respectively.

According to a further embodiment, the cartridge comprises an adapter that can be installed in the filter head, and an insert that can be inserted into the adapter and which contains an agent to be added to the water, in particular a sanitizing agent insert.

The system thus provides a cartridge consisting of two basic components.

The adapter comprises at least some of the components for sealing engagement on the filter head (or "on the filter head"), such as a thread for being screwed thereto.

A replaceable insert which contains the agent can be inserted into the adapter.

This insert is designed to be replaceable, so that, for example, not the entire cartridge has to be exchanged for the sanitizing process, but only the insert.

For example, the insert can be in the form of a compact disposable product and does not need to have a thread for being screwed into the filter head.

The sanitizing agent preferably comes in the form of a solid. More particularly, the sanitizing agent is in the form of at least one tablet.

This makes it easier to store and provide the sanitizing agent. It will only dissolve when employed.

Preferably, a sanitizing agent in particular in tablet form is used, which will only dissolve when water is passed by.

Such sanitizing agents in particular contain sodium carbonate and substances which form acids or bases in water, and/or surfactants.

If such a tablet is located in standing water, in particular in a chamber that is closed by screen inserts, the concentration around the tablet will increase as a result of the incipient dissolution thereof, so that further dissolution practically comes to a standstill.

Only when the tablet is flushed with water it will dissolve during the sanitizing process, so that a sanitizing solution is produced from the water and the dissolving tablet.

Compared to a liquid sanitizing agent or rapidly dissolving solids, the use of such a tablet has the advantage that a sanitizing solution with a relatively uniform concentration will be produced, so that any mixing prior to the introduction into the tanks and/or conduits to be sanitized can be dispensed with.

The disclosure furthermore relates to a cartridge, in particular a sanitizing cartridge which is designed for the aforementioned system. Hence, the cartridge in particular comprises a connection head which has an inlet and an outlet and which can be coupled to the filter head intended for a filter candle.

More particularly, the cartridge may comprise an adapter that can be installed in a filter head, and an insert, in particular a sanitizing agent insert, in particular as described above, which can be inserted into the adapter.

The insert may in particular be latched to the adapter.

In a preferred embodiment, the insert is in the form of a conduit coaxial with a central axis.

Thus, the insert may be in the form of a port of the cartridge, in particular an inlet which is sealingly connected to the filter head in the connected state.

In this embodiment, an annular passage may extend around the insert.

This annular passage serves as a second port, in particular as an outlet of the sanitizing cartridge.

The annular passage may in particular be defined by the insert and by an opposite wall of the adapter.

The insert in particular in the form of a coaxial tube with a chamber that can be flowed through thus provides for optimum flushing.

In one embodiment, the agent, in particular the sanitizing agent, may be arranged in a chamber that can be opened without tools, in particular in a chamber of the insert.

According to this embodiment it is in particular conceivable that only new sanitizing agent is filled in for sanitizing the system, for example, in particular at least one tablet comprising the sanitizing agent is introduced or inserted.

More particularly, the cartridge, in particular the insert, may comprise a removable screen which closes the chamber through which water can flow.

The screen can be removed, the at least one tablet can be inserted, and the chamber can then be closed again.

According to another embodiment, the insert cannot be opened by the user when used as intended. This embodiment has the advantage that the user does not come into contact with the treatment agent, in particular the sanitizing agent, in particular with the tablet.

In one embodiment, the insert comprises at least two, preferably four fins that extend radially outwards and engage in corresponding grooves on the adapter.

The fins provide axial guidance in the direction of insertion, allowing for easy insertion of the insert.

In a further embodiment, at least some of the fins, in particular two fins, have a locking lug which is latched in the adapter.

Thus, when coupled, the insert and the adapter are captively connected to each other.

At the same time, the insert can be easily removed again without tools, thanks to the latching mechanism.

The disclosure furthermore relates to an insert and an adapter for the cartridge as described above.

In particular, the insert and/or the adapter can have all the features described above with regard to the adapter, as far as related to the insert or adapter.

The disclosure furthermore relates to an adapter, which adapter is designed to be connected to a filter head, and wherein an insert can be installed in the adapter, which contains an agent for water treatment, in particular a sanitizing agent.

The adapter can in particular have all the features described above with regard to the adapter.

The disclosure furthermore relates to an assembly comprising an adapter and an insert installed in the adapter. The insert may have all the features described above with regard to the insert.

The disclosure furthermore relates to a method for sanitizing a drinking water-carrying device, in particular a water dispenser.

The method is in particular carried out using a system and/or using a sanitizing cartridge as described above.

A filter candle that is coupled to a filter head which is connected inline into a water-carrying supply conduit, is replaced by a sanitizing cartridge.

Then, a sanitizing agent is introduced into the drinking water-carrying device by way of the sanitizing cartridge.

The sanitizing agent develops its effect there, and after the sanitizing agent has been rinsed or flushed out, the drinking water-carrying device will be clean.

According to one embodiment, a tank, in particular a carbonator, and/or a conduit of the drinking water-carrying device is emptied prior to the introducing of the sanitizing agent and/or prior to the discharging of the sanitizing agent, by introducing a gas.

This has the advantage to prevent the incoming sanitizing solution from mixing in particular with the water supply in the tank, and to remove the sanitizing solution from at least one tank for a concluding rinsing process before drinking water is supplied in order to again rinse the system.

The carbon dioxide which is otherwise used for carbonization and is thus provided anyway, can in particular be used as the gas.

The sanitizing of the system is preferably software-controlled, in particular automated.

It can in particular be contemplated to verify, before a sanitizing process is performed, whether there is still a sufficient supply of carbon dioxide in a respective gas cartridge.

It is also conceivable, for example in the case of a water dispenser, to block the withdrawal of water for a user until the sanitizing process is complete.

Such a system may generate a warning indication for water withdrawal, for example on the tap, e.g. in the form of a colored LED which signals to the user that the water emerging from the tap during the sanitizing process must not be used as drinking water.

In particular a tablet is used as the sanitizing agent, which dissolves as water is flowing by.

BRIEF DESCRIPTION OF THE DRAWINGS

The subject-matter of the invention will be explained in more detail below by way of an exemplary embodiment with reference to the drawings of FIGS. 1 through 9.

FIG. 1a is a perspective view of the filter head with a filter candle installed.

FIG. 1b shows a perspective view of the filter candle and of the sanitizing cartridge that can be installed in the filter head as an alternative.

DETAILED DESCRIPTION

Figure 1A:
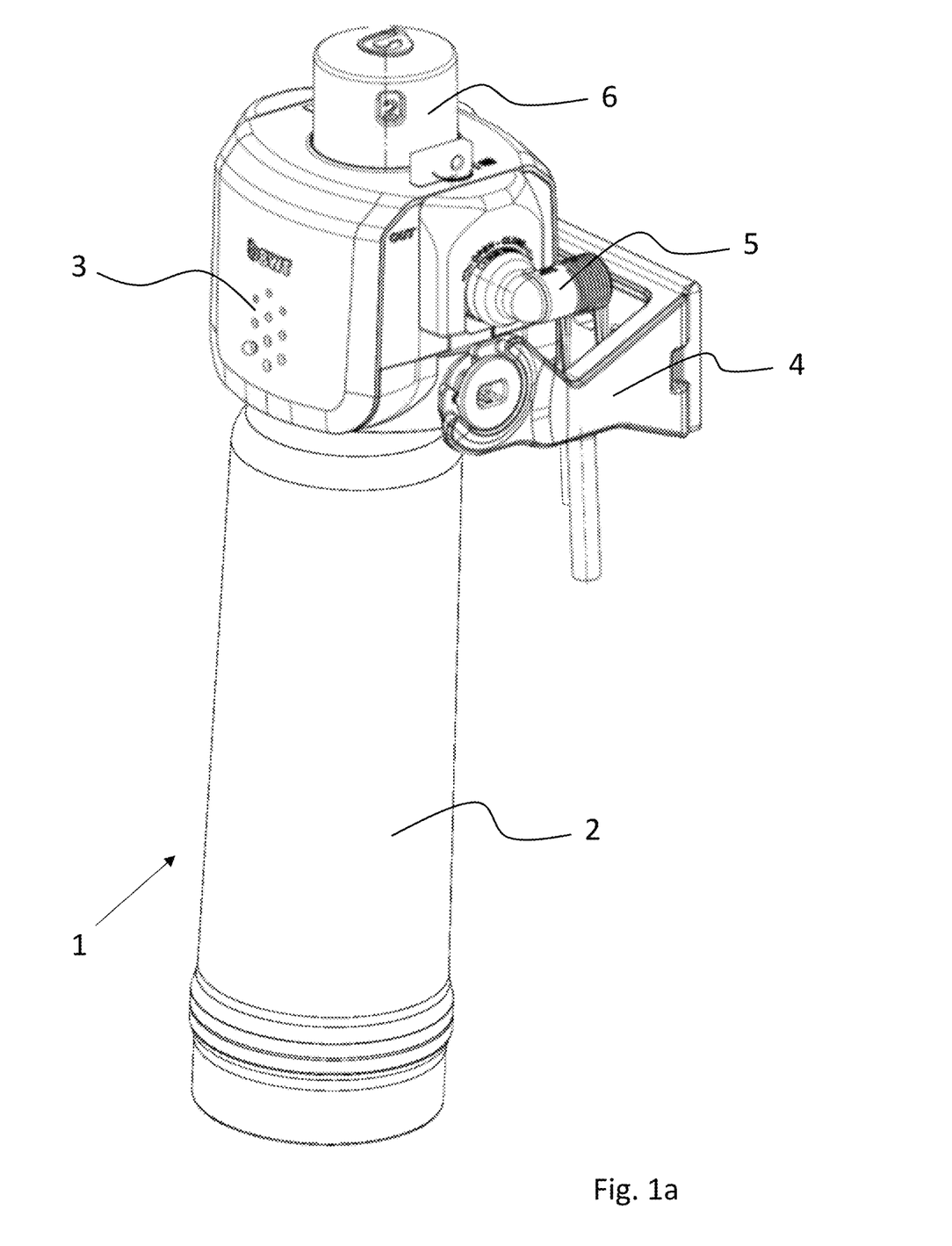
FIGS. 1a and 1b show an exemplary embodiment of a system for sanitizing a drinking water-carrying device.
Figure 1B:
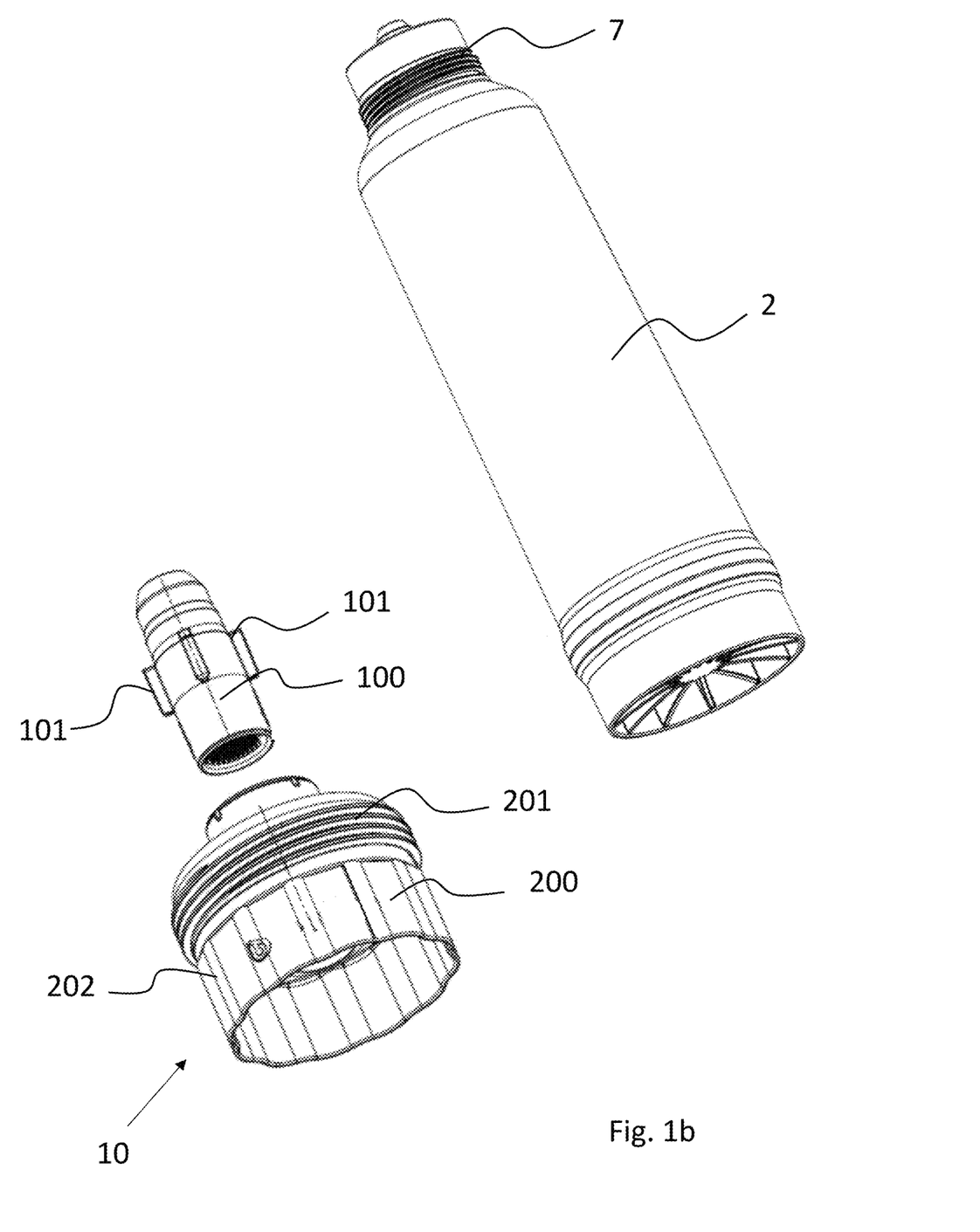

FIGS. 1a and 1b show the components of a system 1 for sanitizing a drinking water-carrying device.

FIG. 1a is a perspective view showing a filter candle 2 installed in a filter head 3.

The filter head 3 has an inlet (not visible in this view) and an outlet 5 via which the filter head is connected into a pressurized pipe (not shown).

The water flows through the filter candle 2 which contains water treatment components, in particular an ion exchange material and activated carbon, and is conveyed towards the drinking water-carrying device via outlet 5.

In this exemplary embodiment, the filter head 3 is attached to a wall mount 4.

Furthermore, the filter head 3 comprises a control element 6 which can be used to set a flow ratio of softened and non-softened or less softened water. In this way, the desired degree of softening can be adjusted and the system can in particular be adapted to the degree of hardness of the drinking water available on site.

As can be seen in FIG. 1B illustrating the detached filter candle 2, the head of filter candle 2 has a thread 7 which serves to connect the filter candle 2 to a corresponding thread of the filter head 3.

The head of filter candle 2 furthermore comprises a water inlet and a water outlet, via which water is introduced into the filter cartridge 2, for example via a downcomer, and which is discharged again, for example via an annular passage surrounding the downcomer, in order to then be supplied to the drinking water-carrying device via outlet 5 of the filter head 3.

A sanitizing cartridge 10 can be connected to the filter head 3 instead of the filter candle 2.

The cartridge described below can also be used for other purposes than for the purpose of sanitizing. Instead of a sanitizing cartridge containing a sanitizing agent, it may also be a different cartridge, with the difference of not containing an sanitizing agent. For the sake of simplicity, the cartridge will be referred to as a sanitizing cartridge 10 below.

The configuration of the connection, or port, of the sanitizing cartridge 10 corresponds to the connection of the filter candle 2. When being installed or removed, the sanitizing cartridge will likewise cause a valve integrated in the filter head 3 to open or close, respectively, which ensures that when the filter candle 20 or the sanitizing cartridge 10 is screwed in/out, the water flow is stopped so that no unintentional water leakage can occur.

In this exemplary embodiment, the sanitizing cartridge 10 consists of the adapter 200 into which a sanitizing agent insert 100 is inserted.

The sanitizing agent insert 100 contains the sanitizing agent in the form of at least one tablet.

The sanitizing agent insert 100 is slidingly introduced into the adapter 200 coaxially.

To this end, the sanitizing adapter 100 has a plurality of fins 101 that extend radially outwards for guiding it when being inserted.

The reusable adapter 200 has a thread 201 corresponding to that of the filter candle 2.

Since the sanitizing cartridge 10 only needs to contain sanitizing agent for a single sanitizing process, significantly less volume is required for this purpose, so that the sanitizing cartridge 10 has an overall shorter length than the filter candle 2 in this exemplary embodiment.

Once the adapter 200 has been coupled with the sanitizing agent insert 100, the sanitizing cartridge 10 can be screwed into the filter head 3 using a rotary handle 202 with a profile for a better grip.

Figure 2:
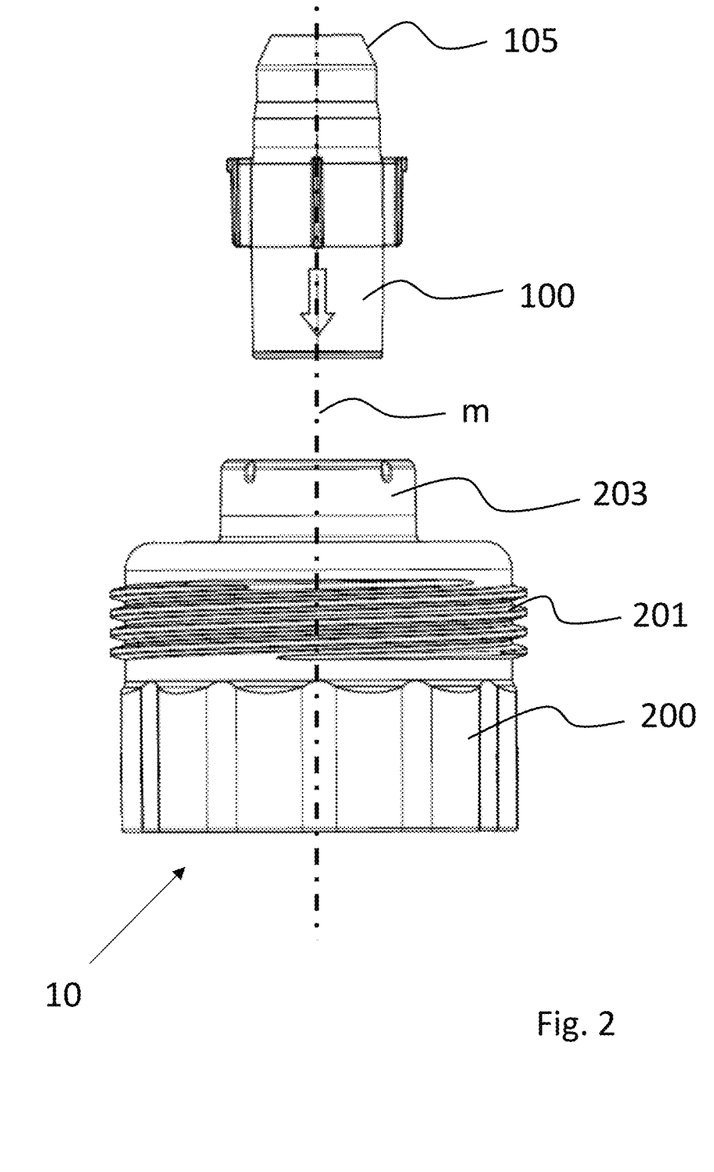
FIG. 2 is a side view of the sanitizing cartridge and the sanitizing agent insert which can be inserted into the adapter of the sanitizing cartridge.

FIG. 2 is a side view of the sanitizing cartridge 10 with the sanitizing agent insert 100 removed.

Sanitizing agent insert 100 and adapter 200 are coaxial to their central axis m.

Central axis m is coaxial to the thread 201 and to a central axis of the connection 105 which serves as an inlet in this exemplary embodiment.

The sanitizing agent insert 100 is tubular and is inserted into a receptacle 203 of the adapter 200 in the axial direction.

In this exemplary embodiment, receptacle 203 protrudes beyond the thread 201 and has a smaller diameter than thread 201.

Figure 3:
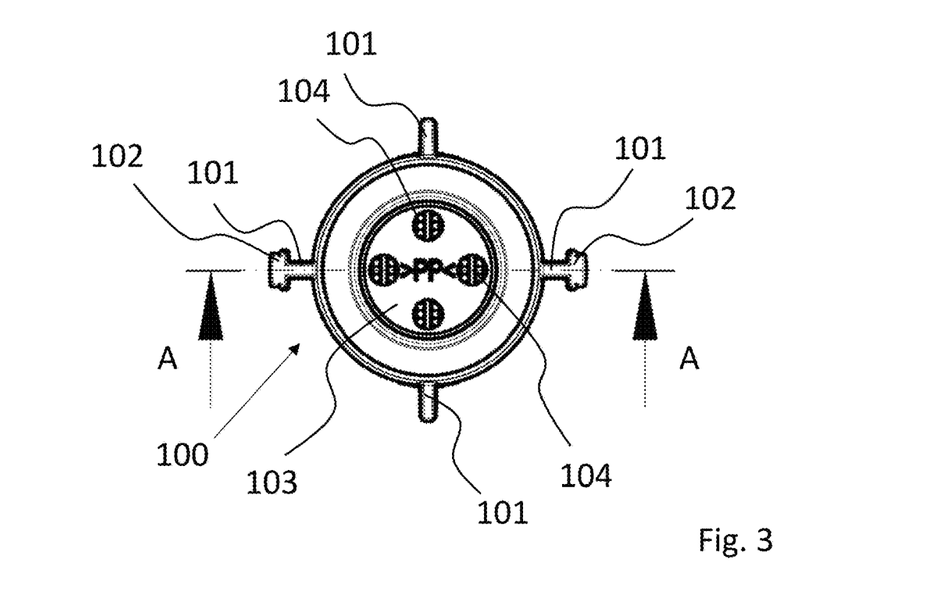
FIG. 3 is a top plan view of the sanitizing agent insert.

FIG. 3 shows the sanitizing agent insert 100 in a top plan view.

In this top plan view, the sanitizing agent insert 100 is ring-shaped and has a coaxial passage (106, see FIG. 4) which is closed from above by a screen disk 103.

This allows water to flow through the sanitizing agent insert 100.

In this exemplary embodiment, the screen disk 103 has a plurality of openings 104, each one closed by a screen.

Screen disk 103 can serve as a flow limiter which provides for a predefined volume flow in order to gradually but completely dissolve the sanitizing agent while the system is flushed with the sanitizing agent.

Alternatively, a predefined volume flow can be implemented on the system side, or by a flow limiter integrated in the sanitizing agent insert 100 and/or in the adapter 200.

Furthermore, the sanitizing agent insert 100 has four radially extending fins 101 distributed around its perimeter.

Two opposing fins 101 have a locking lug 102 which is effective for latching the sanitizing agent insert 100 in the adapter.

Figure 4:
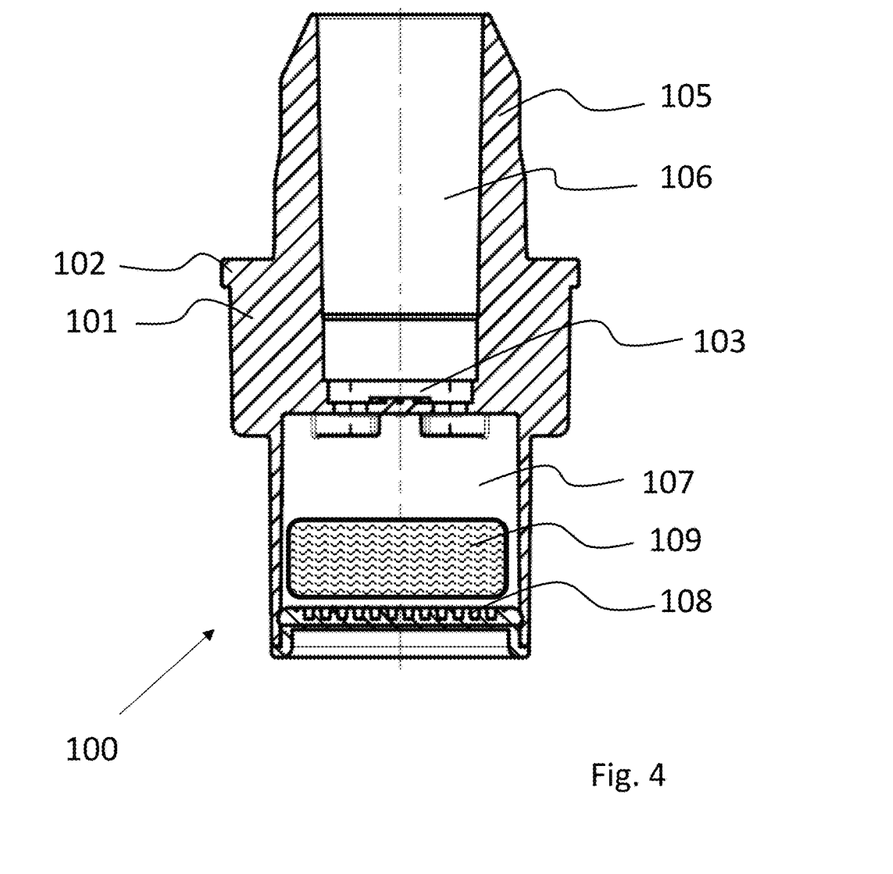
FIG. 4 is a sectional view taken along line A-A as indicated in FIG. 3.

FIG. 4 shows a sectional view taken along line A-A indicated in FIG. 3.

Starting from a conical connection 105 which serves as the inlet of the sanitizing cartridge, the sanitizing agent insert 100 has a passage 106 leading to a chamber 107.

Chamber 107 is closed at the top by screen disk 103 and at the bottom by screen disk 108, so that the sanitizing tablet 109 does not fall out.

In this way, the chamber 107 can be flowed through and the sanitizing tablet 109 will dissolve in the process.

Optionally, the screen disk 108 may be designed to be removable without using tools.

Thus, it is conceivable to refill the chamber 107 with a tablet in order to reuse the sanitizing agent insert 100.

According to another embodiment, however, the screen disk 108 cannot be removed by the user when used as intended. This prevents the user from coming into contact with the sanitizing agent.

However, what has to be replaced for a sanitizing procedure is only the sanitizing agent insert 100 which can be provided in the form of an inexpensive injection molded plastic part and which in particular does not have to include the complex thread for being connected to the filter head.

The sectional view also shows that two opposite fins 101 have a locking lug 102 in an upper portion, which together with the fin 101 form a T-shape and which are used to latch the sanitizing agent insert 100 in place.

Figure 5:
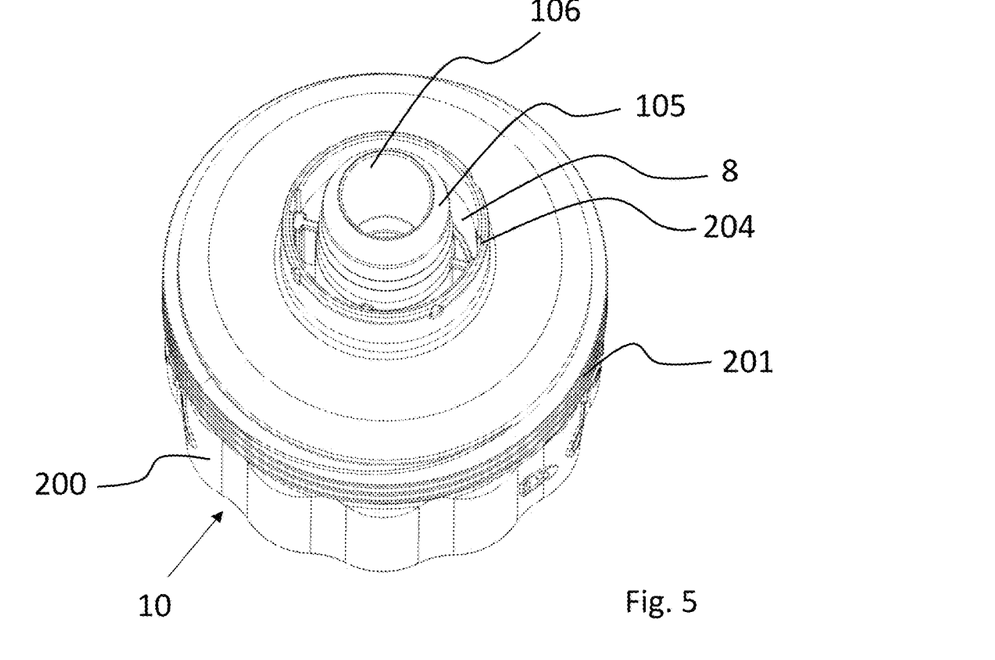
FIG. 5 is a perspective view of the sanitizing cartridge.

FIG. 5 is a perspective view of the sanitizing cartridge, in particular showing the connection, i.e. port, of sanitizing cartridge 10.

The coaxial passage 106 of connection 105 serves as an inlet (an inverted configuration is also conceivable). The further connection, in particular the outflow or outlet port, is in the form of an annular passage 8.

Annular passage 8 is defined by the tubular configuration of the sanitizing agent insert comprising the passage 106 which faces the wall of port 204.

Figure 6:
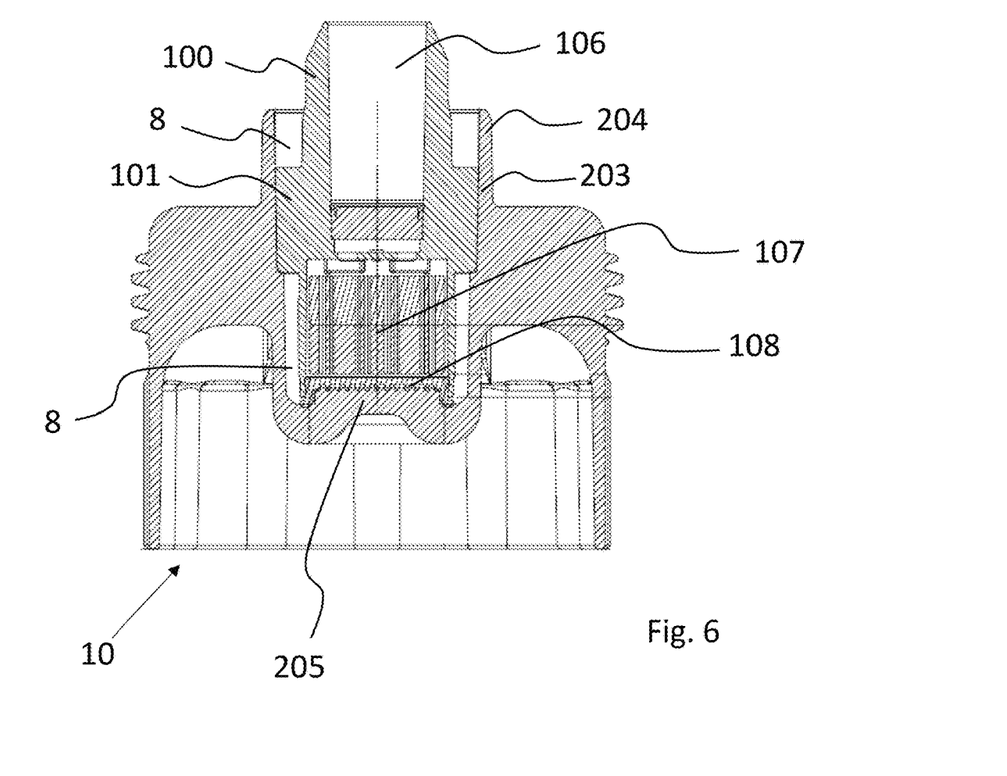
FIG. 6 is an axial sectional view of the sanitizing cartridge.

FIG. 6 shows an axial sectional view of the sanitizing cartridge 10 with the sanitizing agent insert 100 installed.

The sanitizing agent insert 100 is slidingly introduced into the receptacle 203, with the fins 101 serving as a guide.

In the connected state, water flows from the filter head through passage 106, then through chamber 107 which contains the sanitizing tablet, and leaves the chamber 107 through the lower screen disk 108.

At the bottom, the sanitizing agent insert 100 sits on at least one strut 205 (or two struts arranged in the shape of a cross), so that the water can flow out at the bottom.

The direction of the water now mixed with the sanitizing agent then reverses and the water flows via the annular passage 8 which surrounds the sanitizing agent insert 100, to the port 204 or outlet.

It will be appreciated that the water flows past the fins 101 which extend radially through the annular passage 8.

Figure 7:
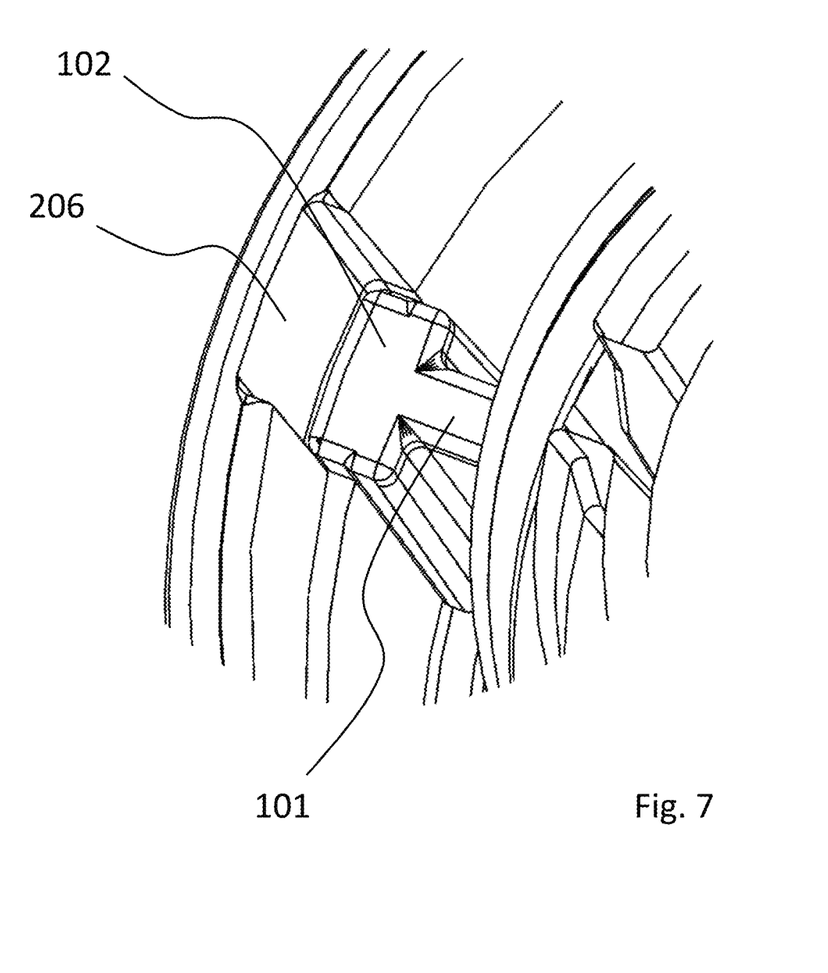
FIG. 7 is a perspective view of a detail in the vicinity of a fin with a locking lug by way of which the sanitizing agent insert is latched.

FIG. 7 is a perspective detail view of a locking lug 102 connected to fin 101.

The locking lug is first guided by the corresponding guide 206 in the adapter wall for then becoming latched below an edge.

However, the guide lug 102 and the edge are designed such that the sanitizing agent insert can also be removed again without tools.

Figure 8:
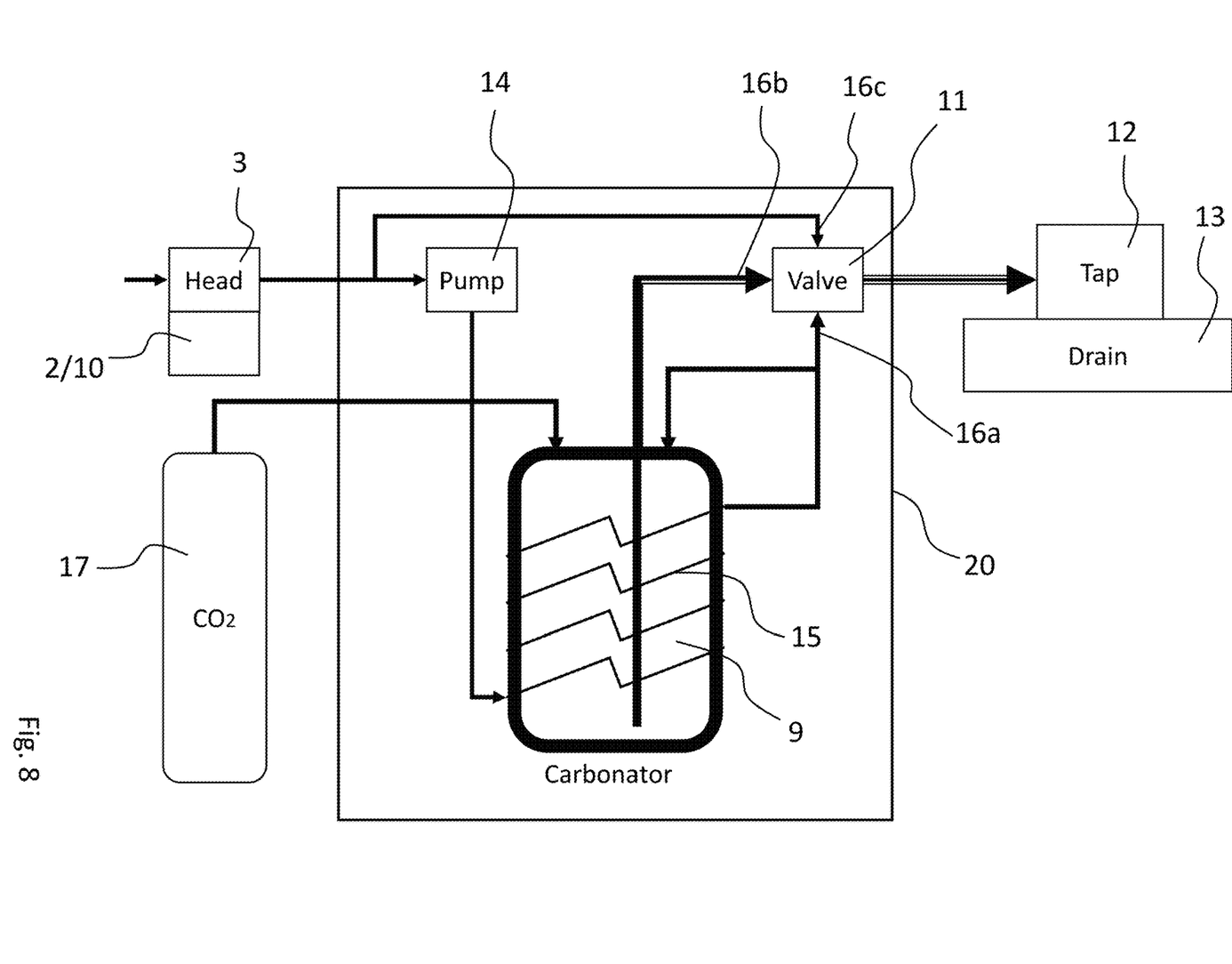
FIG. 8 is a schematic diagram illustrating how the system is used for sanitizing a drinking water-carrying device.

FIG. 8 is a schematic diagram illustrating the overall system which can be used for sanitizing a drinking water-carrying device 20, in this exemplary embodiment in the form of a water dispenser.

The system comprises the filter head 3 in which a filter candle 2 or the sanitizing cartridge 10 as described above can be used as alternatives.

In this exemplary embodiment, the filter head together with the filter candle 2 or with the sanitizing cartridge 10 is arranged outside of the device 20. Installation thereof inside the device 20 is likewise conceivable.

The device in the form of a water dispenser is connected to a tap 12 where water can be extracted, in this exemplary embodiment three types of water.

The type of water to be extracted can be set on the tap which can be connected to valve 11 in the form of a switching valve, for example.

For this purpose, the valve has three inlets 16a to 16c.

Chilled but non-carbonated water is applied at inlet 16a.

Chilled carbonated water is applied at inlet 16b.

Non-chilled water as extracted from the water-carrying pipe directly downstream of filter candle 2 is applied at inlet 16c.

The drinking water-carrying device 20 comprises a cooling system 15 through which chilled water can be directed to inlet 16a.

Device 20 furthermore optionally comprises a pump 14 which is operable to press water through the cooling coils of the cooling system 15 and into the carbonator tank 9. Because of the $CO_2$ held in the carbonator tank 9, the pressure in the tank may be greater than the pipe pressure applied.

Moreover, with increasing pressure in the carbonator tank 9, more $CO_2$ will go into solution.

The chilled water is fed to the carbonator tank 9 which in turn is connected to the $CO_2$ tank 17 to carbonate the water.

Thus, chilled carbonated water from the carbonator tank 9 can be supplied to inlet 16b of valve 11.

It goes without saying that the tap 12 will be located above a drain 13 through which the sanitizing liquid discharged during a sanitizing process can flow into the sewage system.

Figure 9:
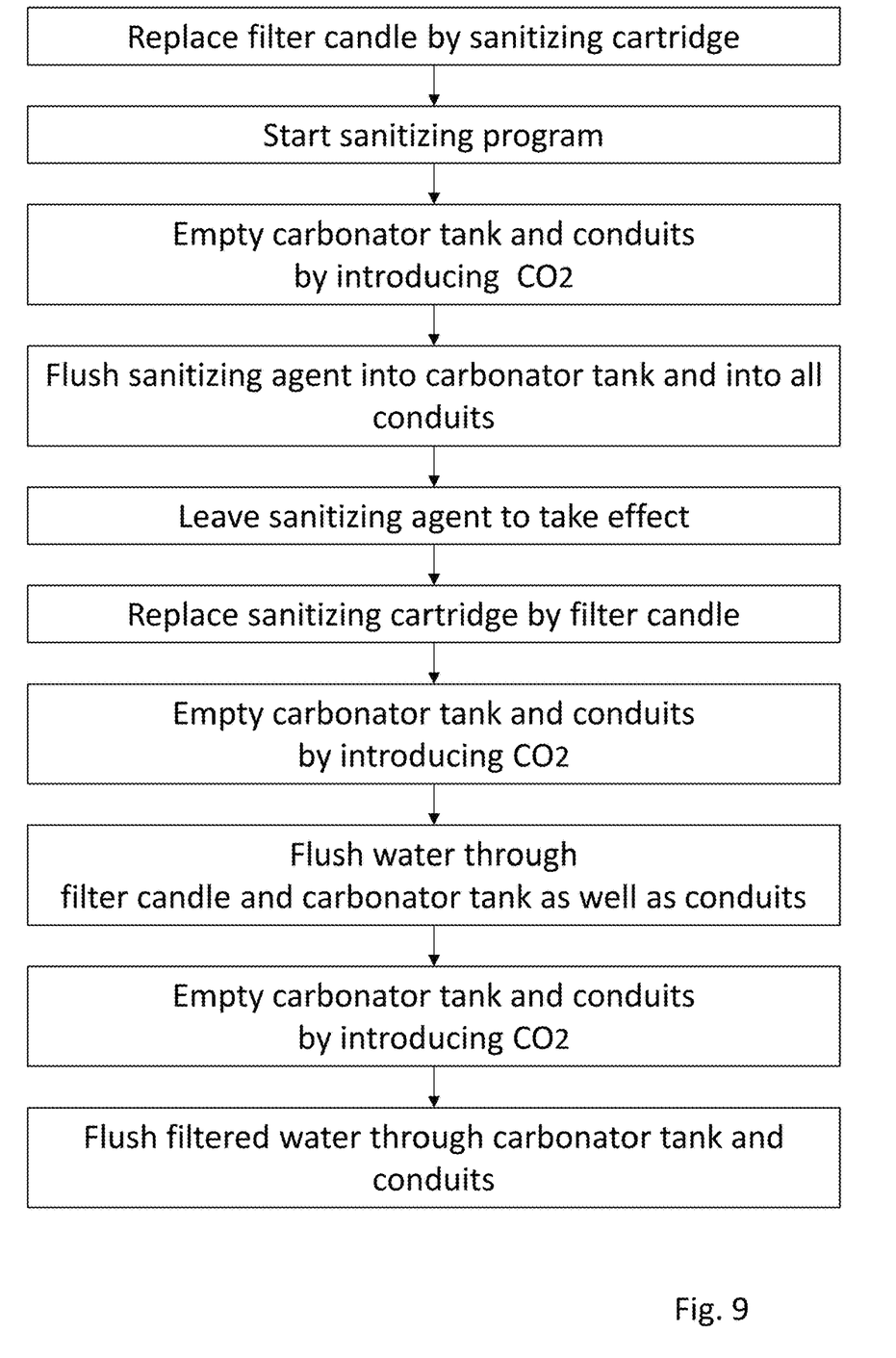
FIG. 9 is a flow chart of the method steps for sanitizing a drinking water-carrying device according to one exemplary embodiment.

As illustrated by the flow chart according to FIG. 9, for sanitizing the entire system including the machine 20, the filter candle is first replaced by a sanitizing cartridge.

Then, a sanitizing program can be started on the device, in particular on the water dispenser.

First, it is checked whether there is still enough carbon dioxide left in the $CO_2$ tank to complete the sanitizing program. For this purpose, the device may comprise a computing device, for example, which calculates the fill level of the $CO_2$ tank since it has been replaced.

In the case of a positive result, the carbonator tank including the conduit leading to inlet 16b is flooded with carbon dioxide.

During this process, pump 14 is disabled.

Subsequently, the system is flooded with sanitizing liquid by simultaneously and/or sequentially opening the valve 11 at all inlets 16a to 16c until the sanitizing liquid reaches the outlet. In this case, preferably all conduits downstream of the filter head 3 are flooded with sanitizing liquid, i.e. for example also the conduit which leads to inlet 16c.

The water flowing through the sanitizing cartridge 10 causes the at least one tablet contained therein to slowly dissolve so that the entire system downstream of filter head 3 will then be flooded with sanitizing liquid.

The sanitizing liquid is then left to take effect, for example for a duration of 5 to 60 minutes.

Subsequently, for example after a respective system indicator lit up or after an acoustic signal, the sanitizing cartridge is replaced by a new filter candle 2.

By opening the valve 11 without feeding water into the carbonator tank, the carbonator tank and the conduit leading to inlet 16b are again emptied by introducing carbon dioxide.

Thereafter, first the filter candle is flushed and the carbonator tank as well as all the conduits leading to ports 16a to 16c are flooded with water by opening valve 11 at all inlets 16a to 16c and turning on pump 14.

In order to really completely flush the sanitizing agent out of the system, the carbonator tank 9 together with the conduit leading to inlet 16b is then emptied again using carbon dioxide, in order to then flood all the conduits again with filtered water.

The sanitizing process will then have been completed and the drinking water dispenser is ready for further use.

A signaling means provided on the tap, such as an LED, for example, can signal that the device 20 is ready for operation again, meaning that the sanitizing process has been concluded.

The invention allowed to provide for simple, safe, and convenient sanitizing of a drinking water-carrying device.

LIST OF REFERENCE NUMERALS

1 System for sanitizing a drinking water-carrying device
2 Filter candle
3 Filter head
4 Wall mount
5 Outlet
6 Control element
7 Thread
8 Annular passage
9 Carbonator tank
10 Sanitizing cartridge
11 Valve
12 Tap
13 Drain
14 Pump
15 Cooling system
16a-16c Inlet
17 $CO_2$ tank
20 Drinking water-carrying device (water dispenser)
100 Sanitizing agent insert
101 Fin
102 Locking lug
103 Screen disk
104 Opening
105 Connection
106 Passage
107 Chamber
108 Screen disk
109 Sanitizing tablet
200 Adaptor
201 Thread
202 Rotary handle
203 Receptacle for sanitizing agent insert
204 Connection
205 Strut
206 Guide

The invention claimed is:

1. A system for sanitizing a drinking water-carrying device, comprising:
   a filter head having one inlet and one outlet;
   a filter candle; and
   a sanitizing cartridge,
   wherein the filter head is configured to alternatively receive either
      the filter candle, or
      the sanitizing cartridge, and
   wherein the sanitizing cartridge includes
      a sanitizing agent configured to be flushed into the drinking water-carrying device via the filter head,
      an adapter configured be installed in the filter head, and
      an insert installed in the adapter for dispensing the sanitizing agent into the drinking water-carrying device.

2. The system as claimed in claim 1, wherein the sanitizing agent is a solid in the form of at least one tablet.

3. The system as claimed in claim 1,
   wherein the insert is latched in the adapter.

4. The system as claimed in claim 1,
   wherein the insert comprises a conduit, and
   wherein the conduit is coaxial with a central axis of the sanitizing cartridge.

5. The system as claimed in claim 4,
   wherein the sanitizing cartridge further comprises an annular passage between the insert and a wall of the adapter.

6. The system as in claim 1, wherein the sanitizing cartridge further comprises a flow restrictor.

7. The system as in claim 1,
   wherein the insert has at least two fins which extend radially outwards and engage in corresponding grooves of the adapter.

8. The system as claimed in claim 7,
   wherein at least one of the at least two fins comprises a locking lug which is latched in the adapter.

9. A method, comprising:
   providing a drinking water-carrying device having a filter head and a filter candle received in the filter head;
   providing a sanitizing cartridge, the sanitizing cartridge comprising
      a sanitizing agent,
      an adapter configured to be installed in the filter head, and an insert installed in the adapter; and
   replacing the filter candle with the sanitizing cartridge and dispensing the sanitizing agent into the drinking water-carrying device through the filter head.

10. A method, comprising:
replacing a filter candle that is received in a filter head in a drinking water-carrying device having one inlet and one outlet with a sanitizing cartridge,
wherein the sanitizing cartridge includes a sanitizing agent, and
wherein the sanitizing agent is arranged in a chamber through which water can flow and which is closed by a screen at least on an outlet side thereof.

* * * * *